UNITED STATES PATENT OFFICE.

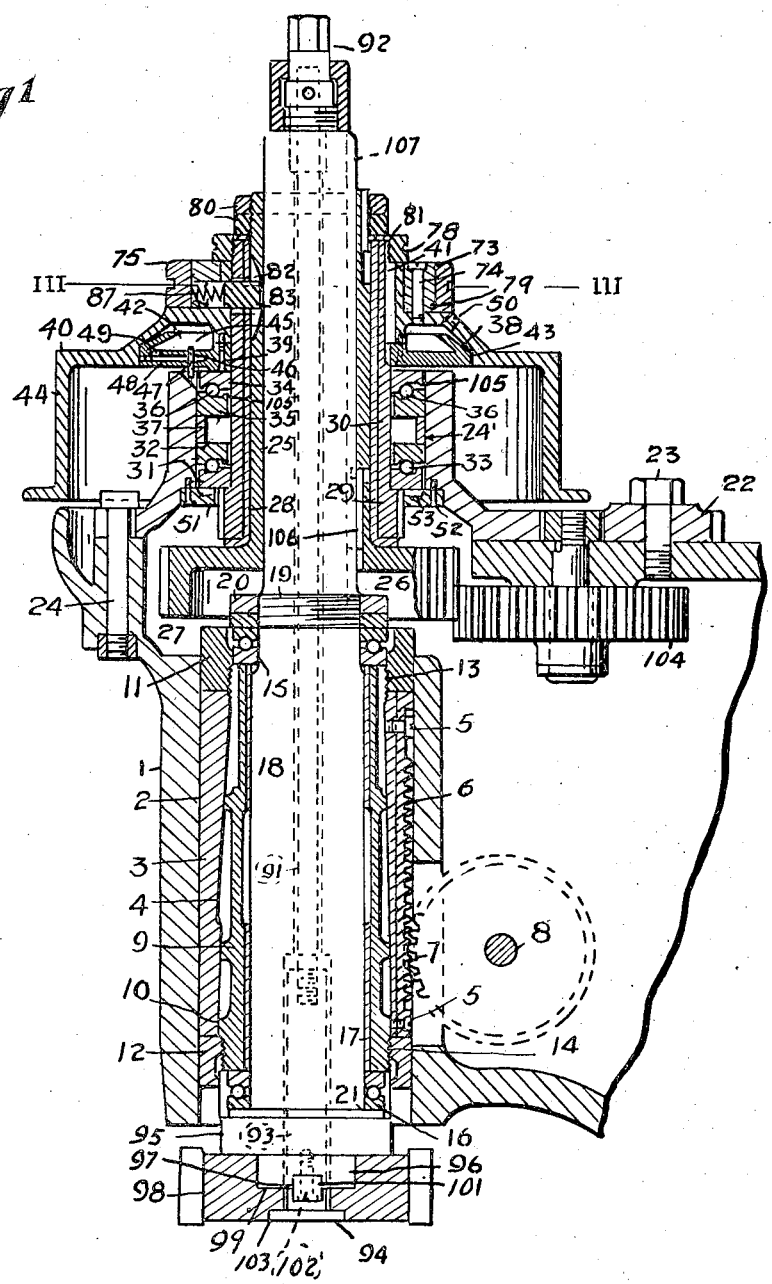

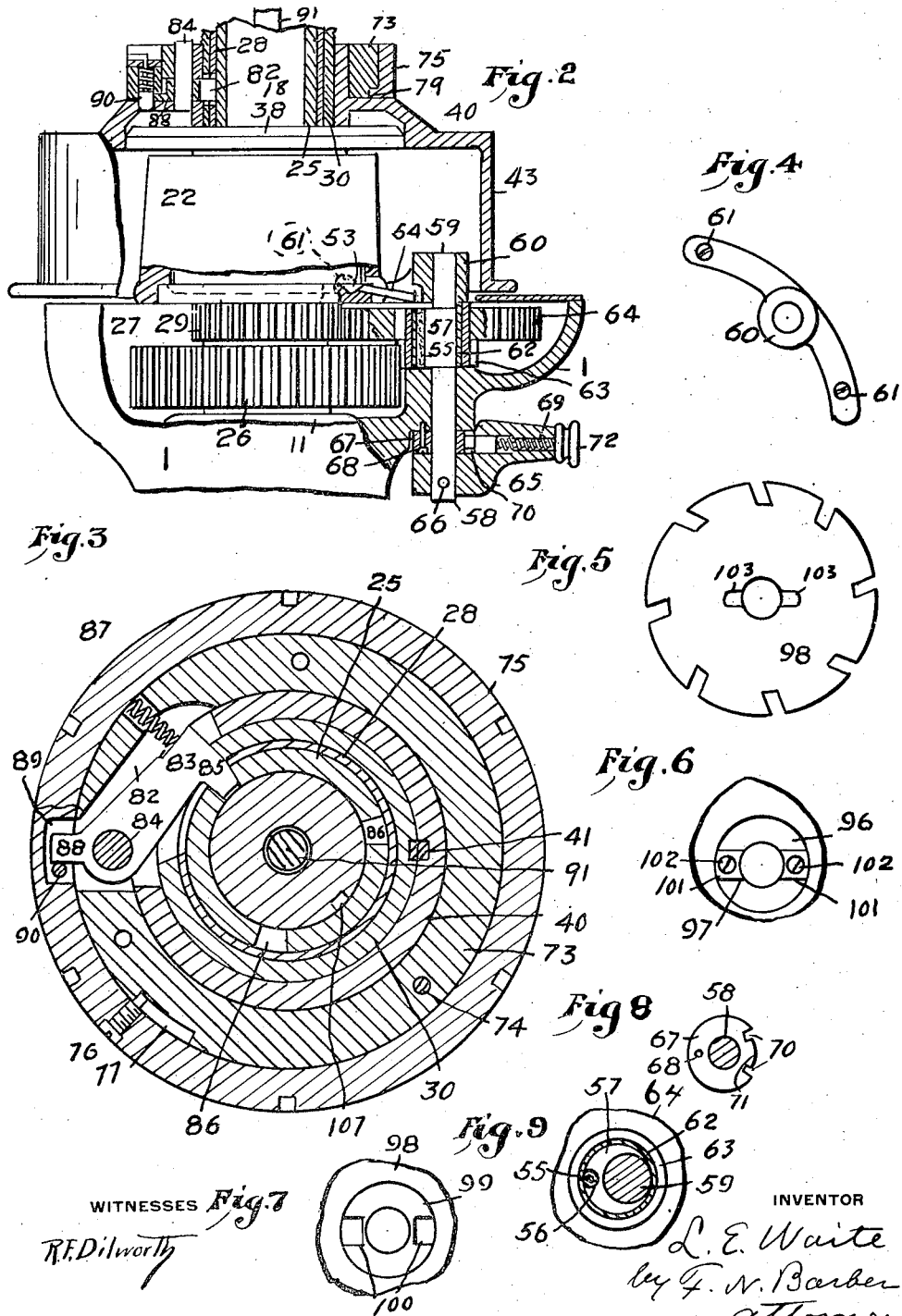

LORENZO E. WAITE, OF TOLEDO, OHIO, ASSIGNOR TO TOLEDO MILLING MACHINE COMPANY, OF TOLEDO, OHIO, A CORPORATION OF DELAWARE.

SPINDLE MECHANISM FOR MILLING AND LIKE MACHINES.

1,356,842.     Specification of Letters Patent.    Patented Oct. 26, 1920.

Application filed May 17, 1919. Serial No. 297,774.

*To all whom it may concern:*

Be it known that I, LORENZO E. WAITE, a citizen of the United States, residing at Toledo, in the county of Lucas and State of Ohio, have invented new and useful Improvements in Spindle Mechanism for Milling and like Machines, of which the following is a specification.

My invention relates to spindle mechanism for milling and like machines.

The objects of this invention are to provide an improved means for changing the speed of the tool spindle, for conducting oil to the various bearings and gear-teeth of the mechanism, and for connecting the tools to the spindle. Other objects will be pointed out hereinafter.

Referring to the accompanying drawings, Figure 1 is a central vertical section showing my invention applied to a milling machine, parts being broken away and parts being shown in side elevation; Fig. 2, a central vertical section of Fig. 1 taken at right angles thereto and showing further parts broken away and other parts in side elevation; Fig. 3, a cross-section on the line III—III of Fig. 1; Fig. 4, a top plan view of the bearing 60; Fig. 5, a bottom plan view of the cutter without the cutting teeth; Fig. 6, a bottom plan view of the spindle with its pheriphery broken away and the blocks 101 in place; Fig. 7, a view like Fig. 6 but with the blocks 101 omitted; Fig. 8, a cross-section through the bearing 58 above the collar 67 (Fig. 2), and Fig. 9, a cross-section through the bearing 59 just above the gear 64.

On the drawings, 1 designates the arm of the main frame or standard for supporting the various parts of the spindle mechanism to be described. The power portion of this arm has the vertical cylindrical opening 2 containing the sleeve 3 slidable up and down therein and having its internal wall 4 flaring downwardly. The external wall of the sleeve has secured therein by the screws 5 the vertical rack 6 meshing with the gear-wheel 7 on the shaft 8, which is operated to move the sleeve up and down. The adjusting sleeve 9 has its outer wall 10 flaring downwardly to correspond with the flare of the wall 4. The nuts 11 and 12 are seated in the opening 2 on the ends of the sleeve 3 and are threaded on the ends of the sleeve 9 as shown at 13 and 14, so that by turning the nuts the sleeve 9 may be adjusted to take up wear between the sleeves 2 and 9. Horizontal roller bearings 15 and 16 are seated on the ends of the sleeve 9 and the bronze bushing 17 within the sleeve 9.

The tool-spindle 18 fits within the bushing 17 and is threaded at 19 to receive the nuts 20, the lower one of which rests on the top of the roller-bearing 15, and serves to hold the bottom shoulder 21 near the lower end of the spindle against the lower side of the roller bearing 16. The upper nut 20 is a lock nut for the lower nut 20.

To the upper face of the arm 1, I secure the auxiliary bearing member 22 by bolts and screws, one screw 23 and one bolt 24 being shown on Fig. 1. The member 22 has the cylindrical vertical opening 24' in axial alinement with the opening 2 and the center of the spindle. The spindle 18 extends upwardly through the opening 24' having an annular space between it and the wall of the said opening. The sleeve 25 of the spindle-gear 26 is on the spindle and rotates therewith. The spindle-gear is quite large and wide and lies in the chamber 27 in the upper side of the arm 1 above the opening 2. The sleeve 25 is surrounded by the bronze bushing 28, which in turn is surrounded by the pulley-gear 29 and its sleeve 30. This sleeve carries the lower ball-race 31 seated on a shoulder at the top of the gear 29. The bearing 22 carries the upper ball-race 32, between which and the ball-race 31 are the antifriction balls 33. Opposite the upper end of the bearing 22 are the upper ball-race 34 carried by the sleeve 30, the lower ball-race 35 carried by the bearing 22, and the antifriction balls 36 between the races 34 and 36. The races 32 and 35 are separated by the spacing ring 37.

On the top of the race 34 is the oiling ring or disk 38 secured by screws 39 to the lower end of the hub of the pulley 40, the said hub being secured to the sleeve 30 by the key 41. The ring 38 is in a recess 42 in the lower face of the pulley, and its outer edge fits tightly against the outer wall of this recess as shown at 43. The pulley has the shape of an inverted cup, the belt-receiving surface 44 surrounding the portion of the bearing 22 above the arm 1.

The ring 38 has in its upper surface the annular channel or chamber 45 whose outer wall is undercut or inclined upwardly toward the axis of rotation of the spindle.

The bottom of the chamber is provided with the hole 46 opening at or near the inner wall 24 of the bearing 22. Preferably a wick 47 is in this hole and extends down so as to wipe along the space between the wall 22 and the outer edge of the ball-race 34. A radial passage 48 intersects the hole 46 and terminates preferably near the outer edge of the ring 38. A port or passage 49 leads from the lower outer part of the chamber 45, that is, from the angle between the bottom of the chamber and its inclined outer wall, into the passage 48. Through the pulley is an opening closable by the plug 50 for supplying the chamber 45 with oil. Beneath the ball-race 31 and around the pulley-gear 29 is the oil receiving ring 51 secured to the bearing 22 by the screws 52. This ring has an annular channel 53 in its upper face arranged to receive any oil dropping between the wall 24 and the ball-race 31. A pipe 54 conducts oil from the channel 53 so that it will drop upon the upper end of the wick 55 seated in a vertical hole 56 in one side of the cylindrical bearing 57 of the back-gear stud. This stud has its lower end 58 journaled in the arm 1 and its upper end 59 in the bearing 60 secured to the upper face of the arm 1 by screws 61.

The bearing 57 is provided with the bronze bushing 62 within the pinion 63 and its upper sleeve-extension, to which the spur-gear 64 is keyed, the latter meshing with the pulley-gear 29 and the pinion 63 with the spindle-gear 26 (Fig. 2). The bearing 57 is eccentric with respect to the axis of the stud so that when the latter is rotated from the position shown on Fig. 1, the gear 64 will be disconnected from the pulley-gear 29. The stud is rotated by the arm or handle 65 secured by the pin 66 to the lower end of the stud 58. The handle 65 is recessed to receive the ring 67 secured to the arm 1 by the screw 68. The handle carries the radial spring-pressed pin or bolt 69 which enters the notches 70 and 71 at opposite limits of movement of the handle. The pin 69 is operated by the knob 72.

To the top of the pulley 40 is secured the ring 73 by means of the screws, one only marked 74 being shown on Fig. 1. The ring 75 is rotatable on the circumferential wall of the ring 74, its limits of rotation being fixed by the screw 76 in the ring 75 traveling in the slot 77 in the ring 73. The rings 73 and 75 are seated in a rectangular recess in the pulley, and a nut 78 working on the upper end of the sleeve 30 bears on the top of the pulley and the ring 73, thereby connecting together into a unit the pulley, the oil ring 38, the roller-bearings, the pulley-gear 29 and the sleeve 30, and the rings 73 and 75, the latter having the rib 79 fitting in an undercut groove in the ring 73. This unit is connected to a larger unit including the spindle-gear 26 and the sleeve 25, by the nuts 80 working on the upper end of this sleeve and bearing on the upper end of the sleeve 30 through the interposed washer 81.

The ring 73, the hub of the pulley 40, the sleeve 30, and the bushing 28 have the recess 82 for the latch or pawl 83 pivoted on the pin 84 in the ring 73. The free end of the latch is provided with the angular inwardly projecting hook or lug 85 adapted to enter one of the recesses 86 in the wall of the sleeve 25 of the spindle-gear 26. The spring 87 constantly urges the free end of the spring toward the said sleeve. On the opposite end of the latch from the lug 85 is the tail-piece or lug 88 oscillatable in the recess 89. 90 is a spring pressed locking pin adapted to pass down past one side of the tail-piece 88 to lock the latch in one of the recesses 86 and past the other side thereof to lock it against entering any of the said recesses.

The spindle 18 has an axial opening from end to end. The rod 91 is rotatable in this opening by applying a wrench to the head 92 connected to the upper end thereof. The lower end of the rod 91 screws into the upper end of the untapered arbors 93, having the cross-bar or T-head 94 at its lower end. The lower end of the spindle has the enlarged part 95 engaging the lower anti-friction roller bearing 16. The spindle terminates below in the reduced portion 96 having the end recess 97. The cutter 98 has the recess 99 to receive the portion 96 and recesses 100 registering with the recesses 97. The metal blocks 101 are seated in the registering recesses and are secured to the spindle by the screws 102. The bottom of the cutter has recesses 103 to receive the T-head 94 on the arbor. The blocks 101 prevent the cutter from rotating on the spindle and the T-head of the arbor prevents the arbor from turning and draws the cutter up tight against the spindle when the rod 91 is rotated in the proper direction.

The lower portion of the gear 26 meshes with the gear 104 for driving the gears in the feed-box, not shown.

The operation of my invention is as follows, the parts being as shown in Figs. 1 and 2. In this case the pin 90 is drawn up past the tail-piece 88, the ring 75 is rotated counterclockwise, whereby the wall of the recess 82 engages the tail-piece and moves the latch from the recess 86 in the spindle-sleeve 25, the end of the spring-pin 90 riding meanwhile on the top of the tail-piece and finally moving down at the opposite side of the tail-piece from that at which it is shown on Fig. 3, thereby locking the latch from locking engagement with the spindle-sleeve 25.

Power applied to the pulley 40 by a suitable belt causes the rotation of the oiling-ring 38, the rings 73 and 75, the sleeve 30, the pulley-gear 29, the pinion 63, the gear 64, the pinion 63, the spindle-gear 26, the spindle-sleeve 25, the spindle 18, the cutter 98, and the gear 104. The pulley 40 drives the spindle and cutter through the back-gears 26, 63, 64, and 29, at a low speed. In case it is desired to drive the spindle at pulley-speed, the handle 65 is unlocked from the sleeve 67 and rotated to move the gears 63 and 64 out of mesh with the gears 26 and 29, respectively. The spring-pin 90 is lifted by hand above the tail-piece 88, whereupon the latch starts, under the influence of the spring 87, toward the spindle bringing the tail-piece beneath the pin which may be allowed to rest thereon. The ring 75 is then turned clockwise, the lug 85 on the dog either entering one of the recesses 86 or resting on the surface of the spindle. In the first case the pin 90 will drop behind the tail-piece and hold the latch locked to the spindle. In the second case, the rotation of the pulley will soon bring the latch lug 85 opposite one of the recesses 86, whereupon the ring 87 will push the lug into that recess and the pin 90 will lock the latch.

The channel 45 in the oiling-ring 38 being supplied with oil and the spindle being driven by the back-gears or pulley 40, oil will be transferred from the channel 45 by the wick 47 to the space between the bearing 22 and the ball-race 34, whence it passes to the ball-race 35 and the balls 36, and thence down the outer surface of the sleeve 30 and past the ball-race 32 to the ball-race 31 and the balls 33. From there the oil passes down between the bearing 22 and the ball-race 31 into the channel 53 in the ring 51 from which it passes through the pipe 54 to the wick 55 and the bearing surfaces of the back-gears. It will be noted that the ball-races are all L-shaped in cross-section, the horizontal member of the L-shape having the rib 105 extending up above the bottom of the race to form a dam for the oil, and keep the balls supplied with a sufficient quantity of oil. If the passage 48 were absent, the oil would be thrown beyond the wick at high speeds of the pulley. When the pulley speed is high the oil banks up at the outer portion of the channel 45 beneath the inclined or undercut outer wall of the oiling ring. This increases the head or height of the column of oil so that oil will be fed to the wick through the passage 48 in spite of the centrifugal force on the oil therein. If the oil is not all thrown beyond the wick, the oil will reach the wick by both the hole 46 and the passage 48.

In case it is desired to remove the spindle, the nuts 20 are unscrewed, allowing the spindle to be withdrawn downwardly. The key 106 connecting the spindle with the gear-sleeve 25 remains in the sleeve, the spindle having the keyway 107 extended to the top of the spindle to allow the upper end of the spindle to pass below the gear 26.

While I have described my invention in detail, I do not desire to be limited to the combinations and the parts thereof, as many changes therein may be made without departing from the scope thereof as defined in the appended claims.

I claim:

1. In a milling machine or the like, a vertical tool spindle, a drive pulley concentric with a portion thereof, driving connections between the spindle and the pulley, bearings for the same, an oil reservoir carried by the pulley, means involving gravity feed whereby oil is conveyed from the said reservoir to the said bearings, and means whereby the head of oil for the gravity feed is increased in the reservoir as the speed of the pulley varies.

2. In a milling machine or the like, a vertical tool spindle, a drive pulley concentric with a portion thereof, driving connections between the spindle and the pulley, bearings for the same, and an oil reservoir carried by the pulley and having a hole between its inner and outer walls to supply oil to the bearings, and a passage communicating with the outer portion of the reservoir for leading oil to the said hole.

3. In a milling machine or the like, a vertical tool spindle, a drive pulley concentric with a portion thereof, driving connections between the spindle and the pulley, bearings for the same, and an oil reservoir carried by the pulley and having a hole between its inner and outer walls to supply oil to the bearings, and a passage communicating with the outer portion of the reservoir for leading oil to the said hole, the inner face of the outer wall of the oil reservoir being inclined upwardly and toward its axis of rotation.

4. In a milling machine or the like, a rotary spindle, a spindle-gear and a sleeve therefor rotatable with the spindle, a pulley-gear and a sleeve therefor surrounding the spindle-gear sleeve, a pulley secured to the latter sleeve, gears having driving connection between the pulley gear and the spindle gear, roller bearings for the pulley-gear sleeve, a device for supplying oil to the bearings, an annular channel arranged to receive oil passing through the bearings, and means conveying the oil from the channel to some of the said connecting gears.

5. In a milling machine or the like, a rotary spindle, a spindle-gear and a sleeve therefor rotatable with the spindle, a pulley-gear and a sleeve therefor surrounding the spindle-gear sleeve, a pulley secured to the latter sleeve, gears having driving connection between the pulley gear and the spindle gear, roller bearings for the pulley-gear sleeve, a device for supplying oil to the bearings, an annular channel arranged to receive oil passing through the bearings, and means conveying the oil from the channel to some of the said connecting gears and to the bearing for the same.

6. In a milling machine or the like, a rotary spindle, a spindle-gear and a sleeve therefor rotatable with the spindle, a pulley-gear and a sleeve therefor surrounding the spindle-gear sleeve, a pulley secured to the latter sleeve, gears having driving connection between the pulley-gear and the spindle-gear, roller bearings for the pulley-gear sleeve, a device for supplying oil to the bearings, an annular channel arranged to receive oil passing through the bearings, and means conveying the oil from the channel to some of the said connecting gears, the races supporting the balls having dams to cause the balls to work in pools of oil.

Signed at Toledo, Ohio, this 10th day of May, 1919.

LORENZO E. WAITE.